United States Patent [19]

Tognazzini

[11] Patent Number: 5,860,023
[45] Date of Patent: Jan. 12, 1999

[54] DEVICE FOR GETTING SOPHISTICATED DATA AND VOICE INFORMATION FROM AUDIENCE

[75] Inventor: Bruce Tognazzini, Woodside, Calif.

[73] Assignee: Sun Microsystems, Inc., Palo Alto, Calif.

[21] Appl. No.: 671,298

[22] Filed: Jul. 1, 1996

[51] Int. Cl.$^6$ .............................. G06F 13/00; G09B 7/00
[52] U.S. Cl. ........................................... 395/835; 434/351
[58] Field of Search ................................ 434/307 R, 320, 434/321, 322, 350, 351; 395/821, 835, 838

[56] References Cited

U.S. PATENT DOCUMENTS

| | | |
|---|---|---|
| 4,377,870 | 3/1983 | Anderson et al. ........................... 455/2 |
| 5,036,389 | 7/1991 | Morales ..................................... 358/84 |
| 5,273,437 | 12/1993 | Caldwell et al. ......................... 434/351 |
| 5,537,141 | 7/1996 | Harper et al. ............................. 348/12 |
| 5,668,859 | 9/1997 | Salimando ........................... 379/101.01 |

*Primary Examiner*—Glenn A. Auve
*Attorney, Agent, or Firm*—McDermott, Will & Emery

[57] ABSTRACT

A polling and communications device permits a speaker to interact with an audience in data or voice modes. Questions can be transmitted to the speaker in data form. Alternatively, the speaker can selectively activate a wireless microphone for a particular member of the audience in response to an indication, sent over a data channel that a user has a question. Alternatively, a user can record a voice message and store it in memory for transmission over a data link. Information about a questioner is provided to the speaker from information stored during registration for the event and may also be provided to the audience.

22 Claims, 21 Drawing Sheets

DEVICE FOR GETTING SOPHISTICATED DATA AND VOICE INFORMATION FROM AUDIENCE

BACKGROUND OF THE INVENTION

1. Field of the Invention

This invention relates to communication systems and more particularly to communication systems used to poll an audience during a presentation.

2. Description of Related Art

When addressing an audience, a speaker may want to poll the audience for responses to question he has posed and he may wish to answer questions posed by the audience. Current audience polling devices do not transmit any information about the audience members who responded to the poll. This leads to a dilemma: if the audience is self-selected then the polling results may be strongly biased, but there is no way to determine this fact without additional polling to retrieve demographic data, a process which is tedious at best and, given human nature, unreliable. Answering questions posed from the audience also presents several problems. An audience member with a question must shout out the question, move to a microphone or wait for a microphone to be passed to him. Additionally, the speaker has little control over which audience members ask questions beyond randomly selecting them to avoid chaos. This may lead to a situation where irrelevant, repetitive, boring, and self-serving questions are asked of the speaker which results in an information-poor exchange between the speaker and the general audience.

Magnetic stripe readers are known which allow for the transfer of digitally encoded information from the stripe to a computing device. This technology allows an individual to provide information upon demand to any reader-enabled device.

IR transceivers are also known which allow for the transfer of digitally encoded information between two computing devices. Acting as an input/output communications interface, IR transceivers allow for wireless connectivity.

Wireless microphones allow for the transmission of analog voice data between a the microphone and a central control unit which, in turn, normally forwards to signal to a public address system. A wireless microphone may be activated by an operator of the central unit by sending it a signal or the microphone may always be "live". Typically different wireless microphones operate on different frequencies.

The digital transmission of data over a radio link is also well known. Various techniques are employed to prevent transmissions from different computing devices using the same frequency from interfering with each other. Carrier Sense Multiple Access with Collision Detection (CSMA/CD) is widely employed in both wireless radio applications and in wired computer networks. This technology is well-understood and widely deployed.

SUMMARY OF THE INVENTION

The present system provides an apparatus, systems, processes and computer program products which allow both the speaker and the audience to interact more effectively thus increasing the amount of useful information that is shared.

The invention provides a method for utilizing demographic information about each audience member that is gathered as they register for an event keyed to an individual identification number. The demographic information is retrieved when a member of the audience responds to a poll question. This, in turn, provides the speaker with a context within which questions from the audience and polling responses may be more effectively interpreted. The demographic information will also assist the speaker in fine-tuning his comments to the audience at hand which may be, for various reasons, a different mixture of individuals than was anticipated.

The invention also provides a framework and method for enhancing the question and answer period common to speaking engagements. It allows great flexibility in the way that questions are submitted by the audience and permits better control over the selection of questions to be answered. Questions from the audience may be submitted by using wireless microphones controlled by the speaker, by using a keyboard that is either part of the polling device or another keyboard using the IR link (e.g., from a PDA), or by recording the question in digital format in the polling device. The latter two methods require subsequent transmission of the digital data to a central computing device. The demographic information that is available about each audience member that submits a question allows the speaker greater control over what issues will be addressed and to target his responses to a specific audience by selecting questions that will be of interest to them. If, for example, the purpose of the event is to provide general product information in a news-release format, then general questions from members of the press may receive a higher priority than highly technical questions from specialists in the field. Alternatively, if the purpose of the event is to explain to and then answer questions from subject matter experts, the general question from the press may receive a much lower priority than those from the experts. Additionally, by utilizing the demographic data, the speaker may choose to answer questions from specific individuals and ignore others.

The invention relates to a terminal for audience participation in a presentation environment, including a control computer having keys for user activation, a transceiver connected to the computer for communicating with a central computer and for communicating with an input to a public address system, and a wireless transceiver connected to the computer for connecting to a local digital device. Digital messages can be sent from individuals in the audience to the central computer. In addition, a microphone is selectively connected to the transceiver for connection to the input to a public address system enabling the device functions as a remote microphone. In addition, audio messages can be sent in digital form over a data link to the central computer. The terminal can be constructed so as to be contained within a user worn badge.

The invention also relates to a central computing device for audience participation in a presentation environment, including a central computer having a keyboard for operator activation, a first transceiver connected to the computer for communicating with remote terminals over a data link, a second transceiver connected to the computer for communicating with remote terminals over an audio link, and a public address system interface for receiving digitally recorded audio and converting it to analog audio for transmission over a public address system and for receiving analog audio for transmission over the public address system. The central computer contains a database storing demographic information about users with an identification of a remote terminal assigned to that user.

The invention is also directed to a method for information exchange between a speaker and members of an audience, by asking a question, receiving a digital response from one or more members of the audience, correlating each response from a member of the audience with previously stored demographic information about that member of the audience, and displaying responses and demographic information or summaries thereof to the speaker.

The invention is also directed to a method for information exchange between members of an audience and a speaker, by receiving questions from the audience for the speaker, displaying the questions or summaries thereof, and selecting a question for response and displaying demographic information about the member of the audience submitting the question selected. A wireless microphone carried by the member of the audience is activated when a question he submitted is selected.

The invention is also directed to a method for information exchange between members of an audience and a speaker, by receiving questions from the audience for the speaker in a digitized audio representation and storing the questions, displaying summaries of the questions, selecting a question for response, and playing back the stored question over a public address system.

The invention is also directed to a system for information exchange between members of an audience and a speaker including a central computer, an operator's terminal connected to the central computer, a speaker's terminal connected to the central computer, and a plurality of remote terminals for members of an audience connected over wireless links to the central computer. One or more of the remote terminals may be connected to a computing device over a local wireless link.

The invention also relates to computer program products for carrying out the techniques of the invention.

The novel features of this invention solve an important problem with audience polling: what are the demographics of the person responding. Also solved is the problem of audience members not being able to submit questions due to physical and time limitations. Additionally, the moderator or speaker is enabled in a novel way to select questions that are felt to be relevant, asked by an appropriate person in the context of the event, and of general interest to the audience.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description of the preferred embodiment, in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1B:
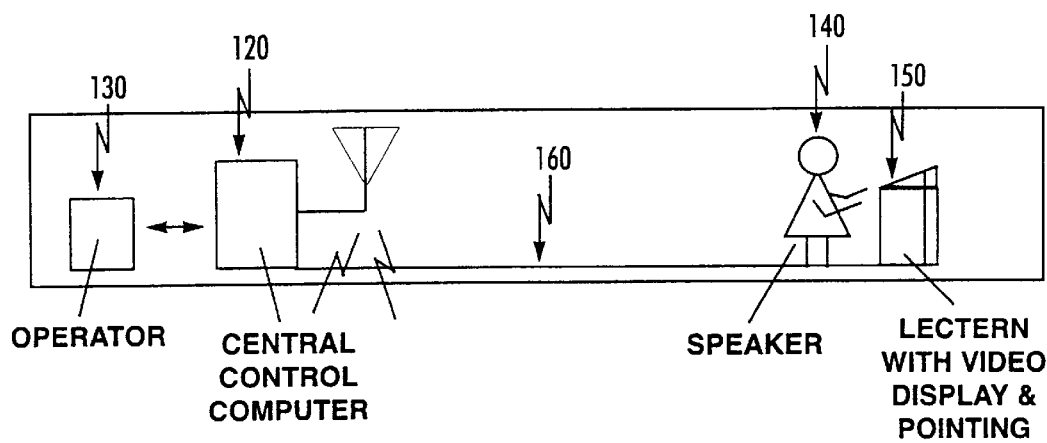
FIGS. 1A and 1B illustrate use of the invention in an exemplary operating environment.
Figure 1A:
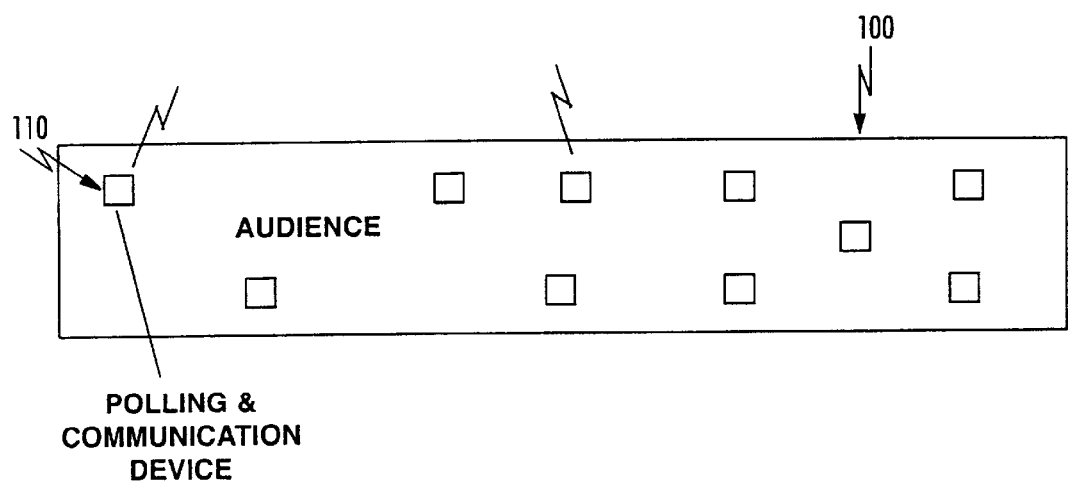

FIG. 1 illustrates use of the invention in an exemplary operating environment. The (110), polling and communication device (110), is possessed by as many audience members (100) as possible. The speaker addressing the audience (140) has a computer display and I/O device (150) such as a pointing device which allows him to communicate with the central computing device (120) over using a communication link (160). The operator (130) of the central computing facilitates display of information to the speaker.

Figure 2A:
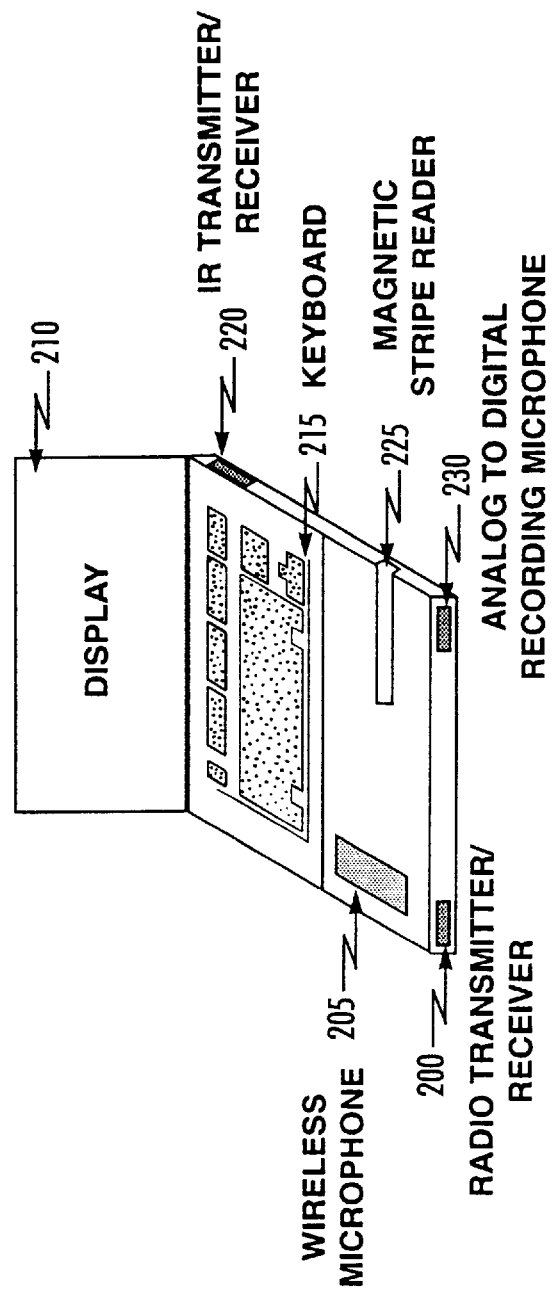
FIGS. 2A is a perspective view of one form of a polling and communicative device.

FIG. 2A depicts a polling and communication device in accordance with the invention implemented as a laptop-style computing device. The components of the device include a video display (210), a keyboard (220), a magnetic stripe reader (225), an infra-red transceiver (215), a wireless microphone (205), an analog to digital microphone recording system (230) and a tunable radio transceiver (200). This embodiment allows the device to either be programmed with the audience member's identification number during the event registration process or to be programmed with any audience member's identification number by that person swiping a card with a magnetic stripe containing the identification number through the magnetic stripe reader (225). In either case, the identification number corresponds to a similar number contained in the central computing device and is used to retrieve demographic information about the audience member.

The infra-red transceiver (215) is provided to allow communication between the invention and other computing devices, such as Personal Digital Assistants (PDAs), which an audience member may prefer to use as a method of composing text questions for later transmission to the central computing device.

Figure 2B:
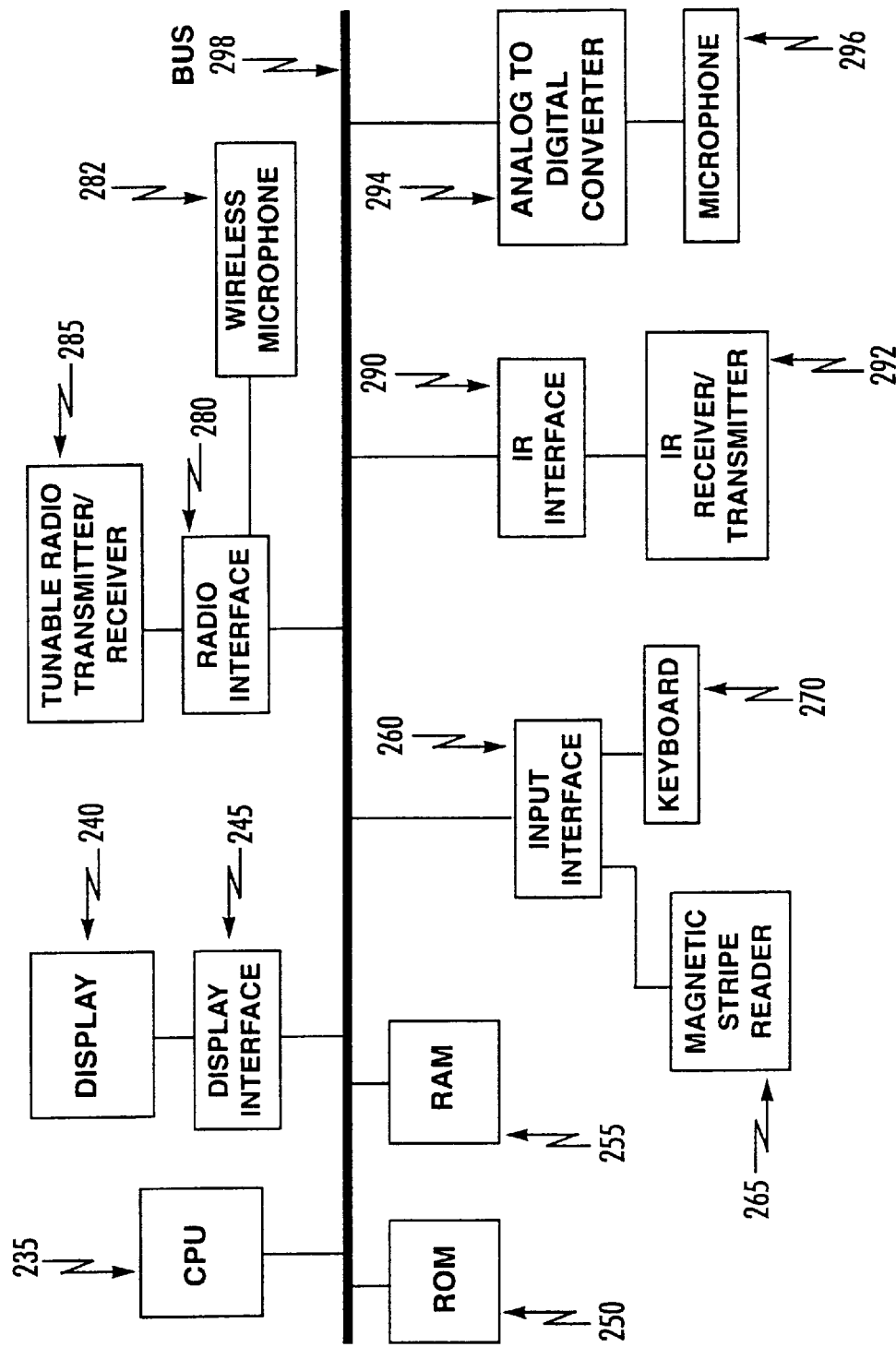
FIG. 2B is a block diagram of the device of FIG. 2A.

FIG. 2B is a block diagram of the device of FIG. 2A. A bus (298) serves as the universal connector for all the components. The microprocessor (235) controls each component using programming and data to be found in memory, such as RAM (255) and ROM (250). An input interface (260) is provided to allow the operation of a keyboard (270) and a magnetic stripe reader (265). An infra-red interface (290) controls the infra-red transceiver (292). The analog to digital converter (ADC, 294) accepts the analog input of the microphone (296) and converts the input stream into a digital format which is then stored in RAM (225) for later transmission. The radio interface (280) controls the tunable radio transceiver (285) to select different frequencies for audio and data transmission, in one mode will be on a wireless microphone (282) frequency, whereas data transmission will normally be on a different frequency. The radio interface, under the control of the microprocessor, may implement various schemes for data transmission, a preferred one being CSMA/CD (see FIG. 8). Finally, the display interface (245) controls the display itself (240).

Figures 3A, 3B:
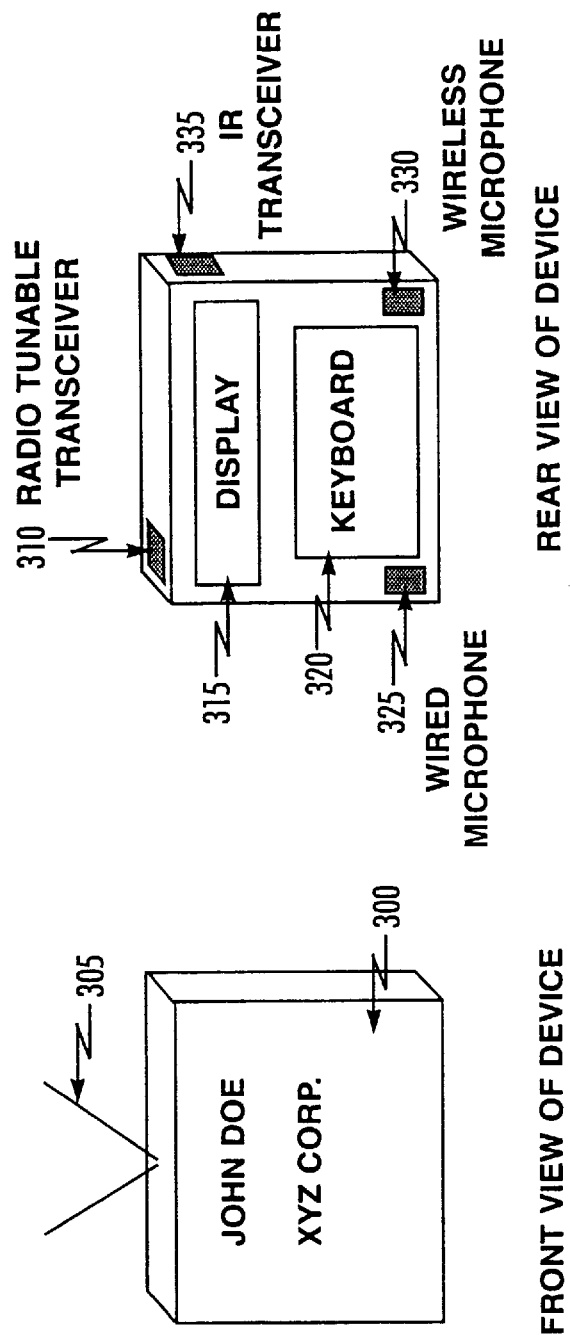
FIGS. 3A and 3B illustrate front and rear views of an exemplary hand-held implementation of the invention.

FIG. 3A and 3B illustrates an implementation of the invention as badge-size computing device. The front of the device (300) contains the normal textual information found on badges and can be worn, for example, by hanging it around the user's neck via a strap (305). The back of the device contains user controls and interfaces which include a display (315), such as an LCD display, a keyboard (320), an infra-red transceiver (335), a wireless microphone (320), microphone for storing messages(325) and a tunable radio transceiver (310). In this embodiment the device is programmed with the audience member's identification number during the event registration process. The identification number corresponds to a number contained in the central computing device and is used to retrieve demographic information about the audience member.

The infra-red transceiver (335) is provided to allow communication between the invention and other computing devices, such as Personal Digital Assistants (PDAs), which an audience member may prefer to use as a method of composing text questions for later transmission to the central computing device.

Figure 3C:
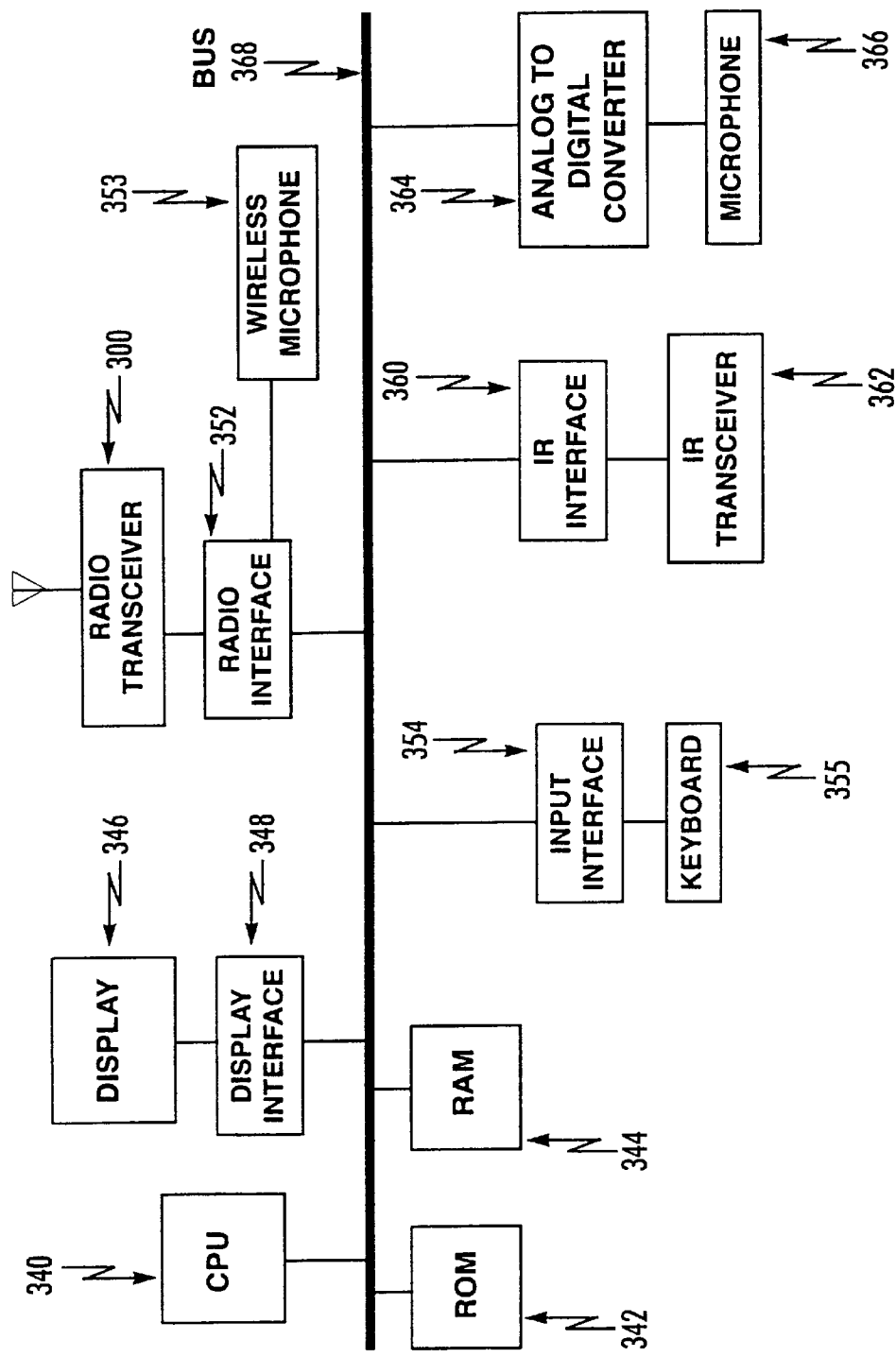
FIG. 3C is a block diagram of the device of FIGS. 3A and 3B.

FIG. 3C illustrates the internal electronic components and architecture of the invention. A bus (368) serves as the universal connector for all the components. The microprocessor (340) controls each component using programming and data to be found in memory components such as RAM (342) and ROM (344). An input interface (354) is provided to allow the operation of a keyboard (355). An infra-red interface (360) controls the infra-red transceiver (362). The analog to digital converter (ADC, 364) accepts the analog input of the microphone (366) and converts the input stream into a digital format which is then stored in RAM (342) for later transmission. The radio interface (352) controls the tunable radio transceiver (350) and the wireless microphone (353). The radio interface, under the control of the microprocessor, may implement various schemes for data transmission, the most likely one to be CSMA/CD (see FIG. 8). Finally, the display interface (348) controls the display itself (346).

The block diagram shown in FIG. 3C differs from that shown in FIG. 2B only in that there is no magnetic stripe reader.

Figure 4:
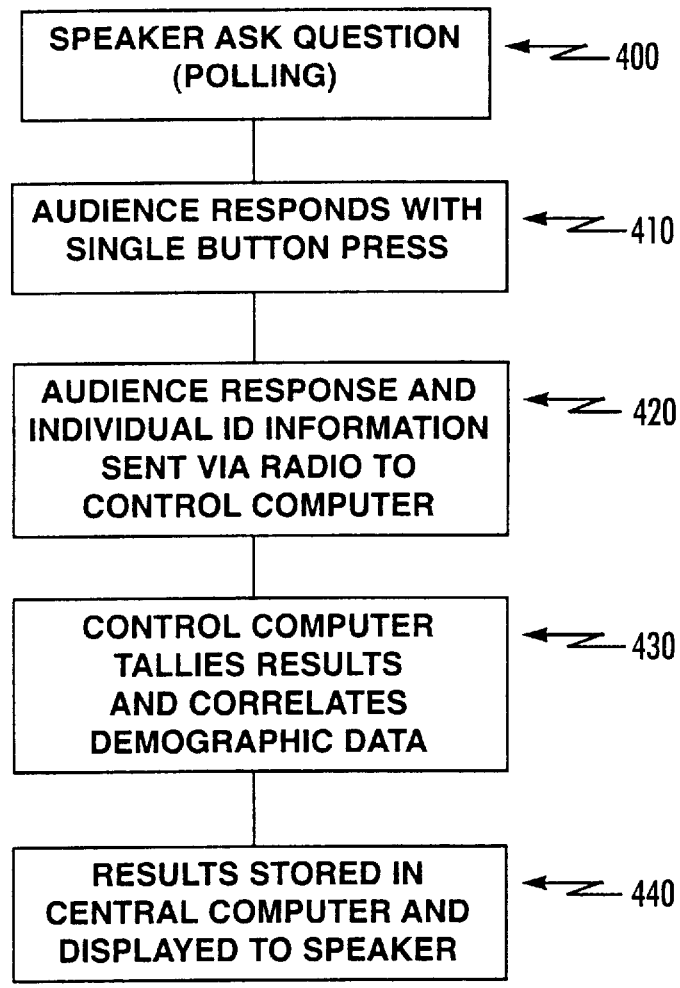
FIG. 4 is a flowchart showing an exemplary use of apparatus for polling.

FIG. 4 is a flowchart showing an exemplary use of apparatus for polling. A speaker asks the audience to respond to a question that has been phrased in such a way that the type or range of possible responses is known (400). An example is a question that has only a binary response such as yes/no or agree/disagree. To answer such a polling question, the audience members respond by pressing the appropriate key on the invention (410). The response and the member's identification number is then transmitted via radio to the central computing device (420) which then retrieves the member's demographic information (via the identification number) and correlates the responses to the demographic data (430). The results are displayed to the speaker and may be stored in the central computing device for later use (440).

Figure 5:
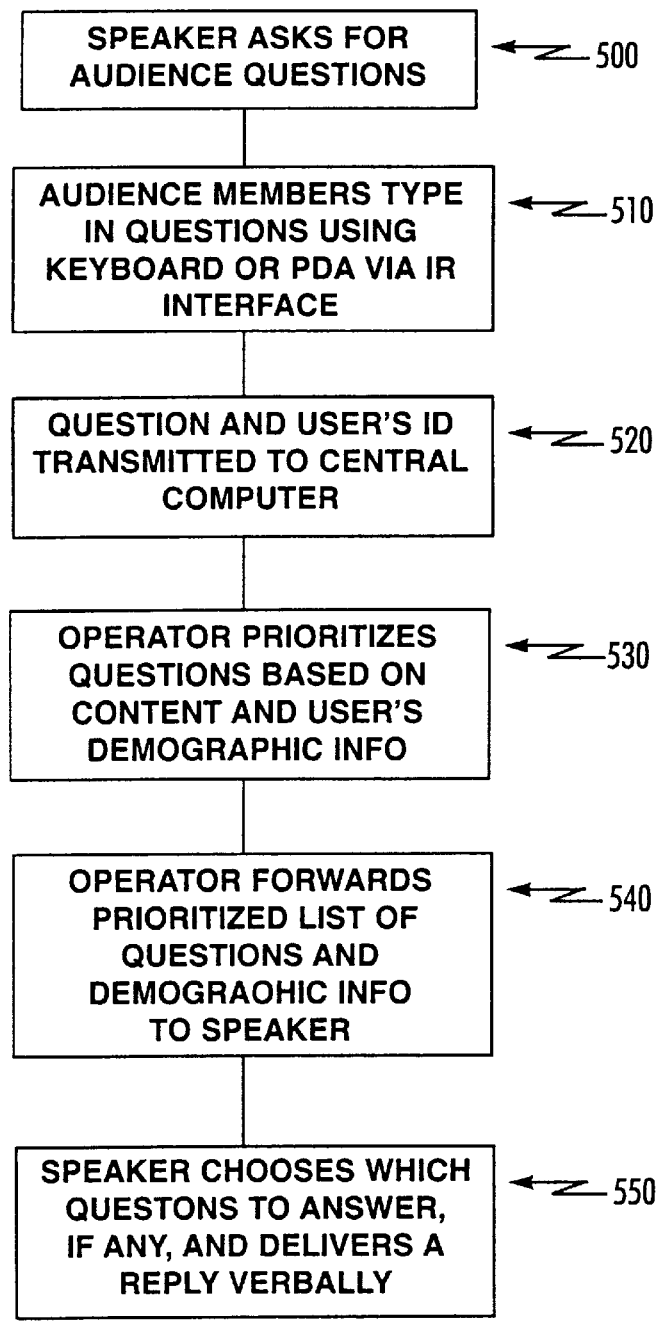
FIG. 5 is a flowchart showing an exemplary use of the polling and communication device for inputting and transmitting questions to a central computing device via the keyboard interface.

FIG. 5 is a flowchart showing an exemplary use of a polling and communications device for inputting and transmitting question to the central computing device via the keyboard interface. The speaker initiates the process by asking the audience for questions (500). Audience members type in their questions using the keyboard of the invention or using another computing device (e.g., a PDA) connected to the invention via an infra-red communications link (510). The questions and the audience member's identification number is transmitted via radio to the central computing device (520). The operator of the central computing device then prioritizes the questions based upon both content and the questioner's demographics using an algorithm devised by the speaker (530). The operator then sends the list of questions and demographic information to the speaker's display (540) where he is then able to select which questions he wishes to respond to (550).

Figure 6:
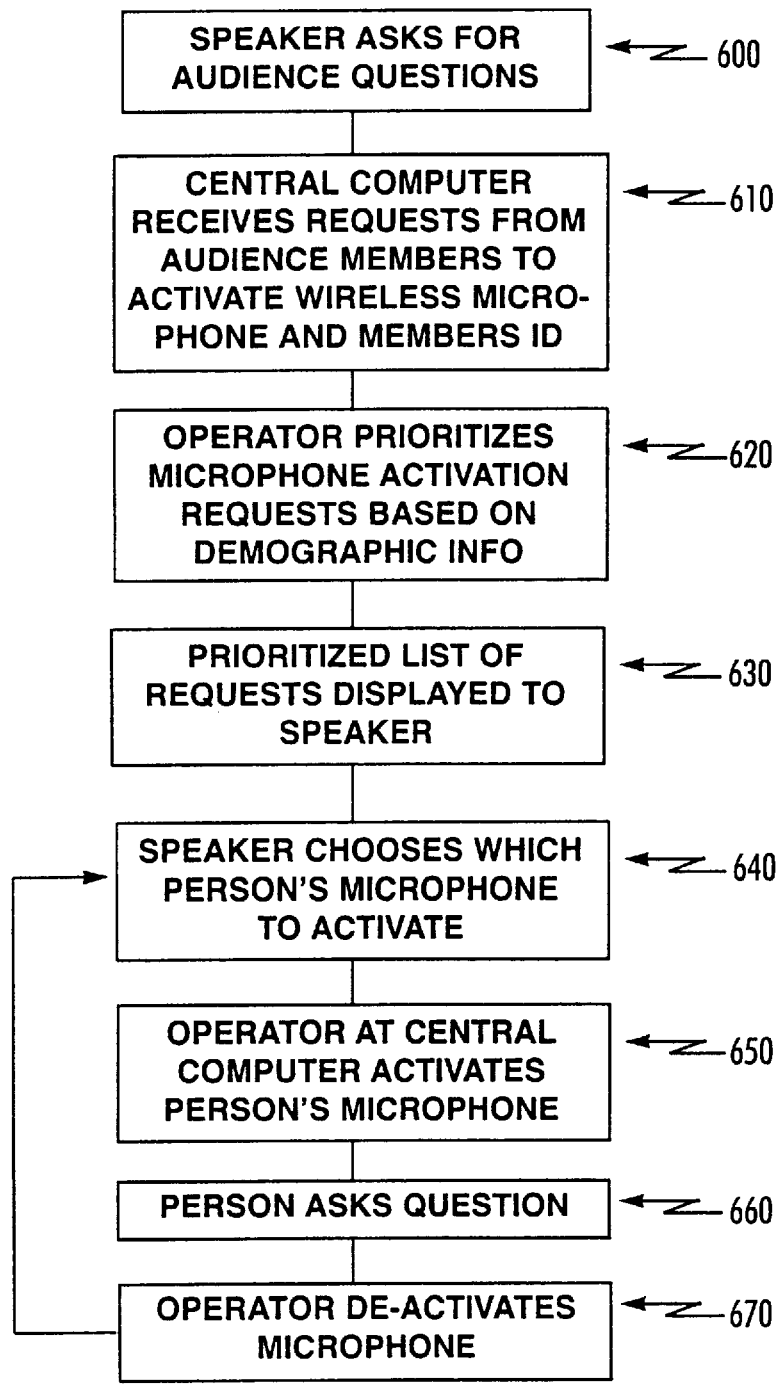
FIG. 6 is a flowchart showing an exemplary use of the polling and communication device submitting questions via its wireless microphone feature.

FIG. 6 is a flowchart showing an exemplary use of a polling and communications device for submitting questions to the speaker using a wireless microphone. The speaker initiates the process by asking for questions (600). The central computing device receives requests from audience members to activate their wireless microphone along with the member's identification number (610). The operator of the central computing device prioritizes the microphone activation requests based on criteria or on an algorithm developed by the speaker that utilizes the demographic information retrieved using the member's identification number (620). The prioritized list of activation requests is displayed to the speaker (630) which then begins a process of selecting and activating microphones for those people the speaker wishes to accept question from. The speaker chooses the first audience member's microphone he wants activated (640) and speaker or the operator at the central computing device signals that member's wireless microphone via its identification number and activates the microphone (650). The audience member whose microphone was activated then asks his question (660) and the microphone is de-activated by speaker or the operator at the central computing device (670). After answering the question, the speaker then may repeat the process beginning at (640).

Figure 7:
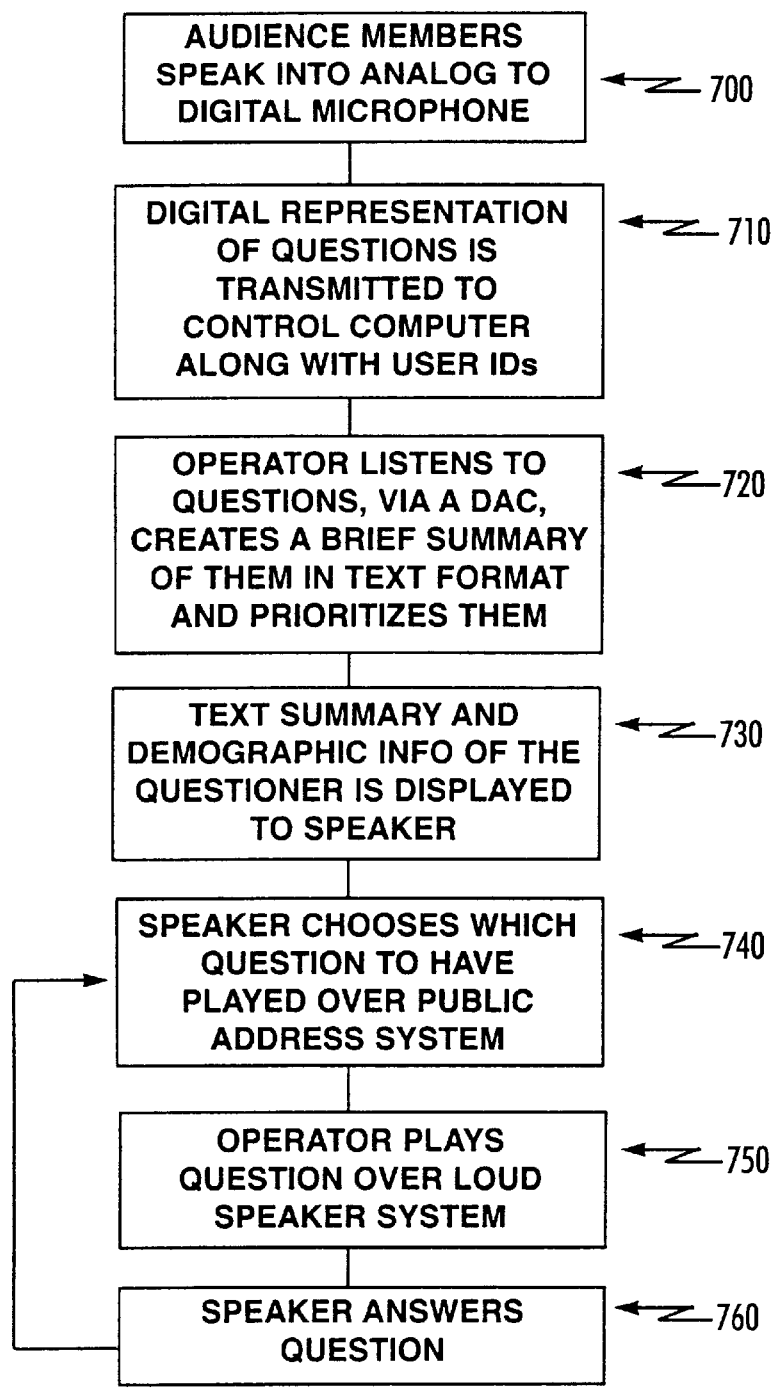
FIG. 7 is a flowchart showing an exemplary use of the polling and communication device for transmitting spoken questions as digital data to the central computing device.

FIG. 7 is a flowchart showing an exemplary use of a polling and communications device for submitting spoken questions as digital data to the central computing device. Audience members wishing to ask a question speak that question into a microphone (700). The analog voice frequencies are sampled at an appropriate rate using an analog to digital converter and then stored as digital information in the invention's memory. The digital information and the member's identification number are transmitted via radio, using, for example, the CSMA/CD protocol, to the central computing device (710). The operator listens to the questions, utilizing a digital to analog converter, creates a brief text summary of each question in a manner agreed upon with the speaker, and provides this summary along with the demographic information, retrieved using the member's identification number (720), as a prioritized list displayed to the speaker (730). The speaker then chooses which question he wishes to answer (740) and the operator then plays the question over a public address systems so that all audience members can hear it (750). The speaker then answers the question (760) and the process begins again at (740).

Figure 8:
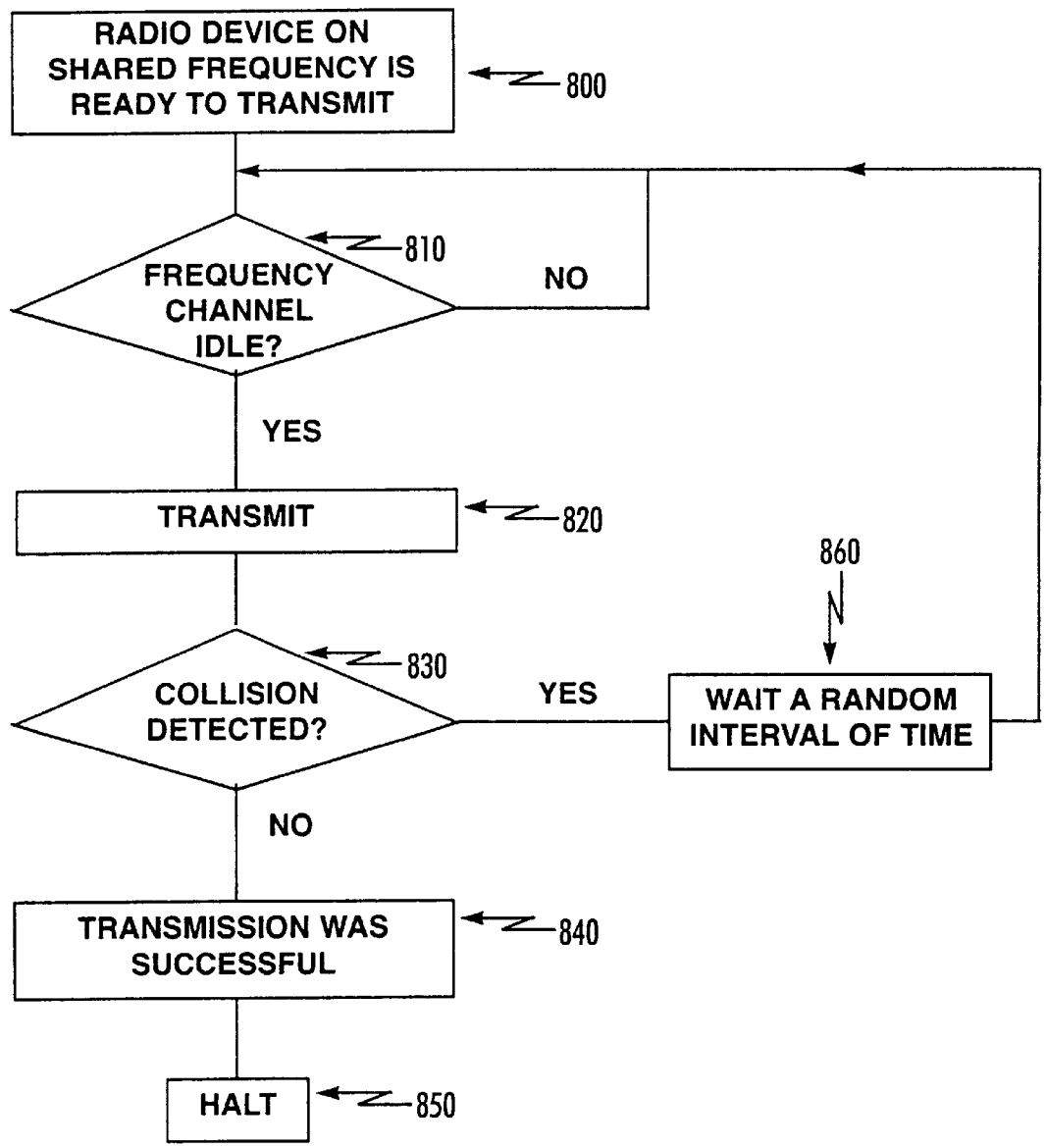
FIG. 8 is a flowchart showing operation of a Carrier Sense Multiple Access with Collision Detection (CSMA/CD) communication protocol.

FIG. 8 is an algorithmic flowchart depicting the method of operation of Carrier Sense Multiple Access with Collision Detection (CSMA/CD) used to transmit digital data from multiple sources on a single frequency. The process is initiated when a radio device has digital data to transmit (800). If the frequency channel is idle (810) then transmission begins (820). If the channel is busy then the device waits until the channel is idle (810) and then begins transmission. If no collision with another transmission was detected by the radio transceiver (830) then the transmission was successful (840) and the process is terminated (850). If a collision did occur (830), then the radio transceiver waits a random amount of time (860) and the process begins again at (810).

The transmission of stored voice samples may occur in real time or may be transmitted at a slower rate over the radio link. If transmitted at a slower rate, samples may be accumulated (stored) for playback at the original rate.

Figure 9A:
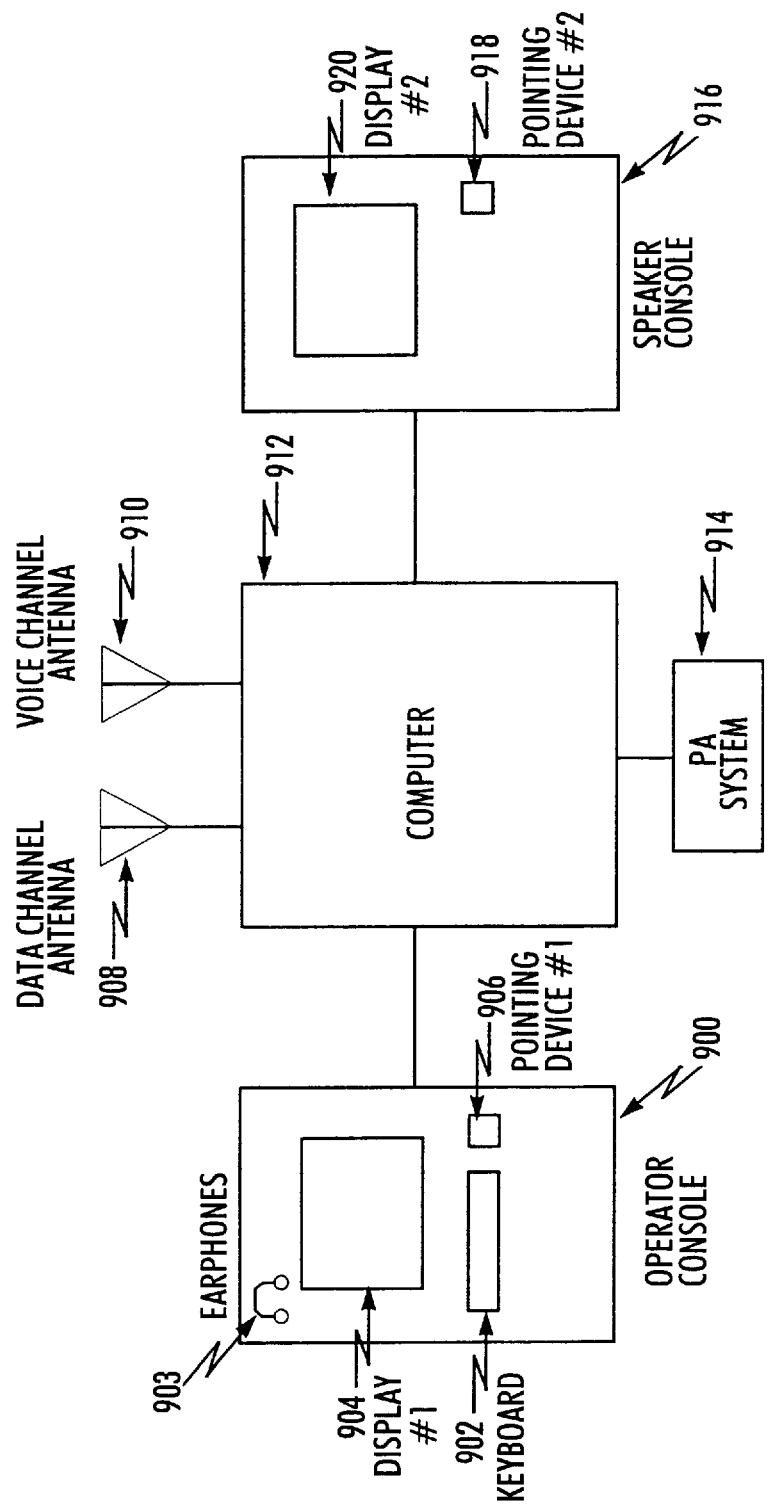
FIGS. 9A, 9B and 9C illustrate the central computer portion of the embodiment of the system and its internal electronic architecture.
Figure 9B:
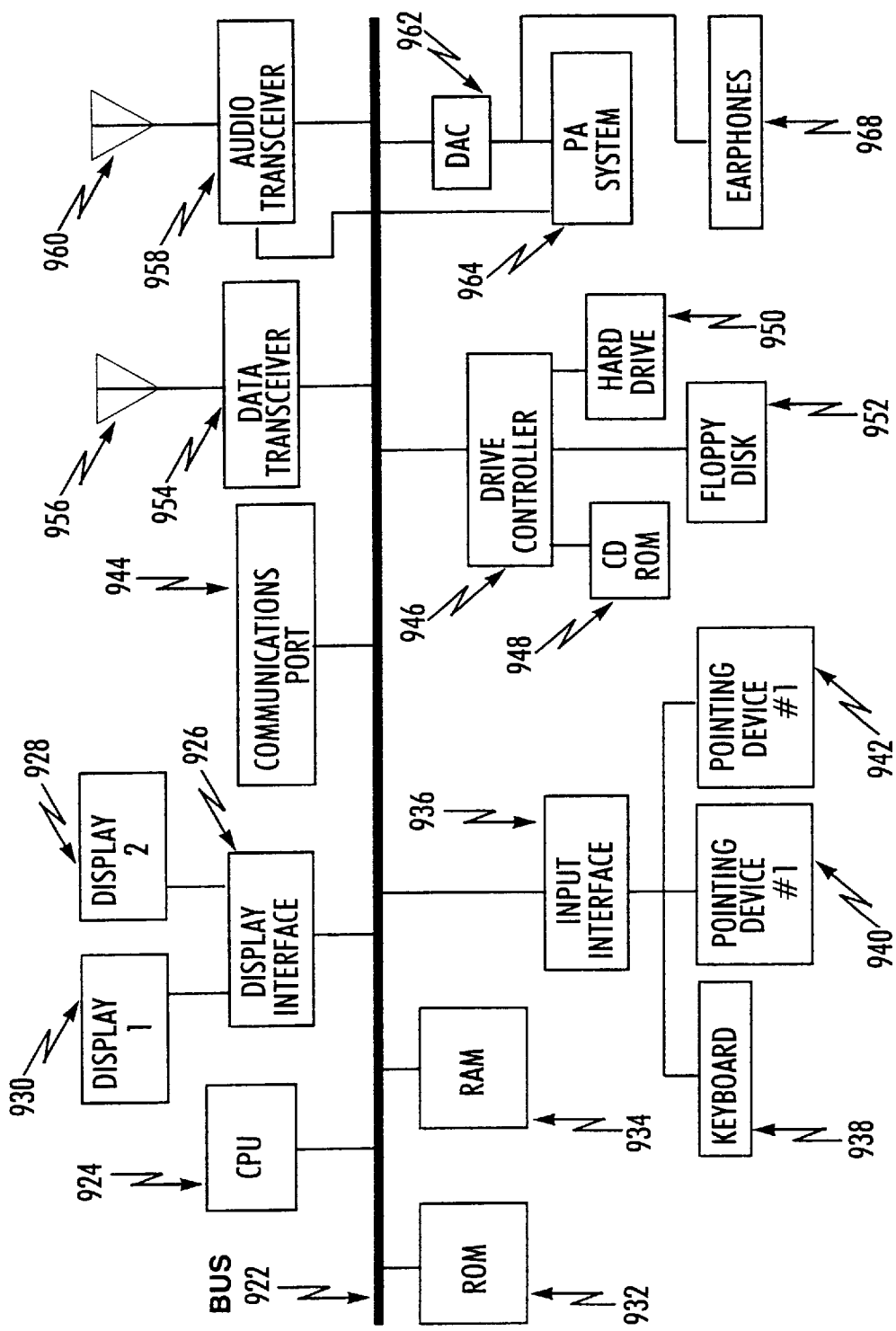
Figure 9C:
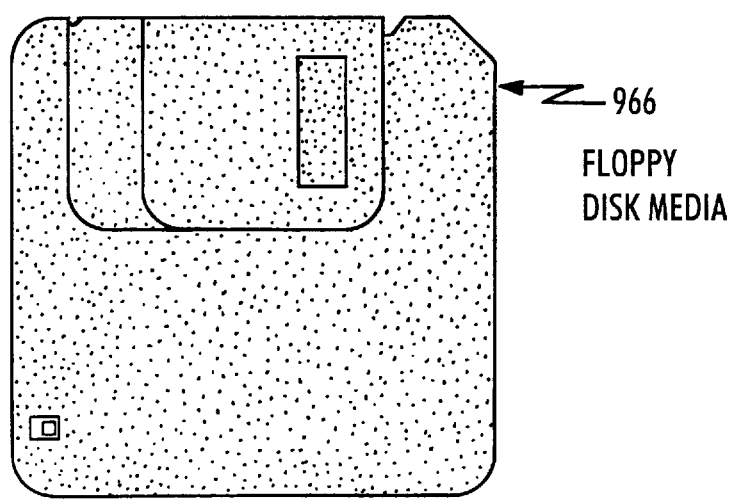

FIGS. 9A, 9B and 9C illustrate the central computer portion of the embodiment of the system and its internal electronic architecture. FIG. 9A depicts the embodiment of the central computer system. The central computer (912) has both a data channel antenna (908) and a voice channel antenna (910) along with a connection to a public address (PA) system (914). The central computer also has to consoles attached. The first console (900) is for the computer operator and includes a display (904), keyboard (902), pointing device (906) and earphones (903). The second console (916) is for the speaker and includes and includes a display (920) and a pointing device (918).

FIG. 9B illustrates the internal electronic components and architecture of the embodiment of the central computer. A BUS (922) serves as the universal connector for all the components. The microprocessor (924) controls each component using programming and data to be found in memory components RAM (932) and ROM (934). An input interface (936) is provided to allow the operation of a keyboard (938) and two pointing devices (940 and 942). A disk drive controller (946) controls a CD ROM (948), a hard disk drive (950) and a floppy disk drive (952). A communication port is provided at (944). A transceiver for data (954) and its antenna (956) along with an audio transceiver (958) and its antenna (960) are also connected to the BUS. The digital to audio converter (962) provides output to the public address system (964) and to the earphones (968). The display interface (926) controls both console displays (930 and 928).

FIG. 9C is a depiction of a floppy disk.

Figure 10:
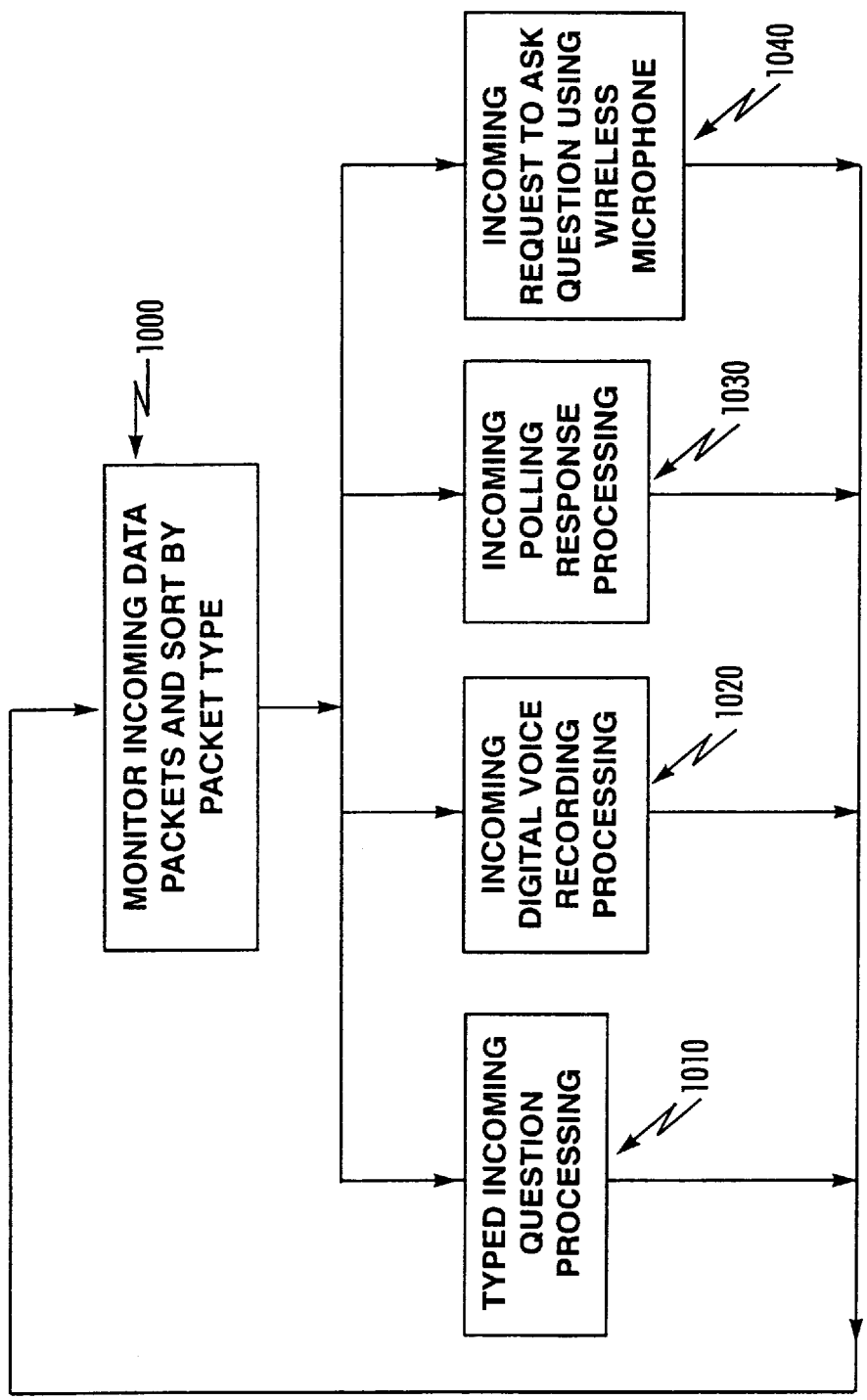
FIG. 10 is a flowchart of a process for the interaction of the central computing device with the remote devices under varying modes of usage.

FIG. 10 is a flowchart of a process for the interaction of the central computing device with the remote devices under varying modes of usage. The central computing device monitors the incoming data packets sent by the remote devices and sorts them by category (1000). If the packet received contains data from a typed question then processing that packet begins at 1010 and is further described in FIG. 11. If the packet received contains data from a digital voice recording then processing that packet begins at 1020 and is further described in FIG. 12. If the packet received contains data from a response to a polling question then processing that packet begins at 1030 and is further described in FIG. 13. If the packet received contains data from a request for wireless microphone activation then processing that packet begins at 1040 and is further described in FIG. 14.

Figure 11:
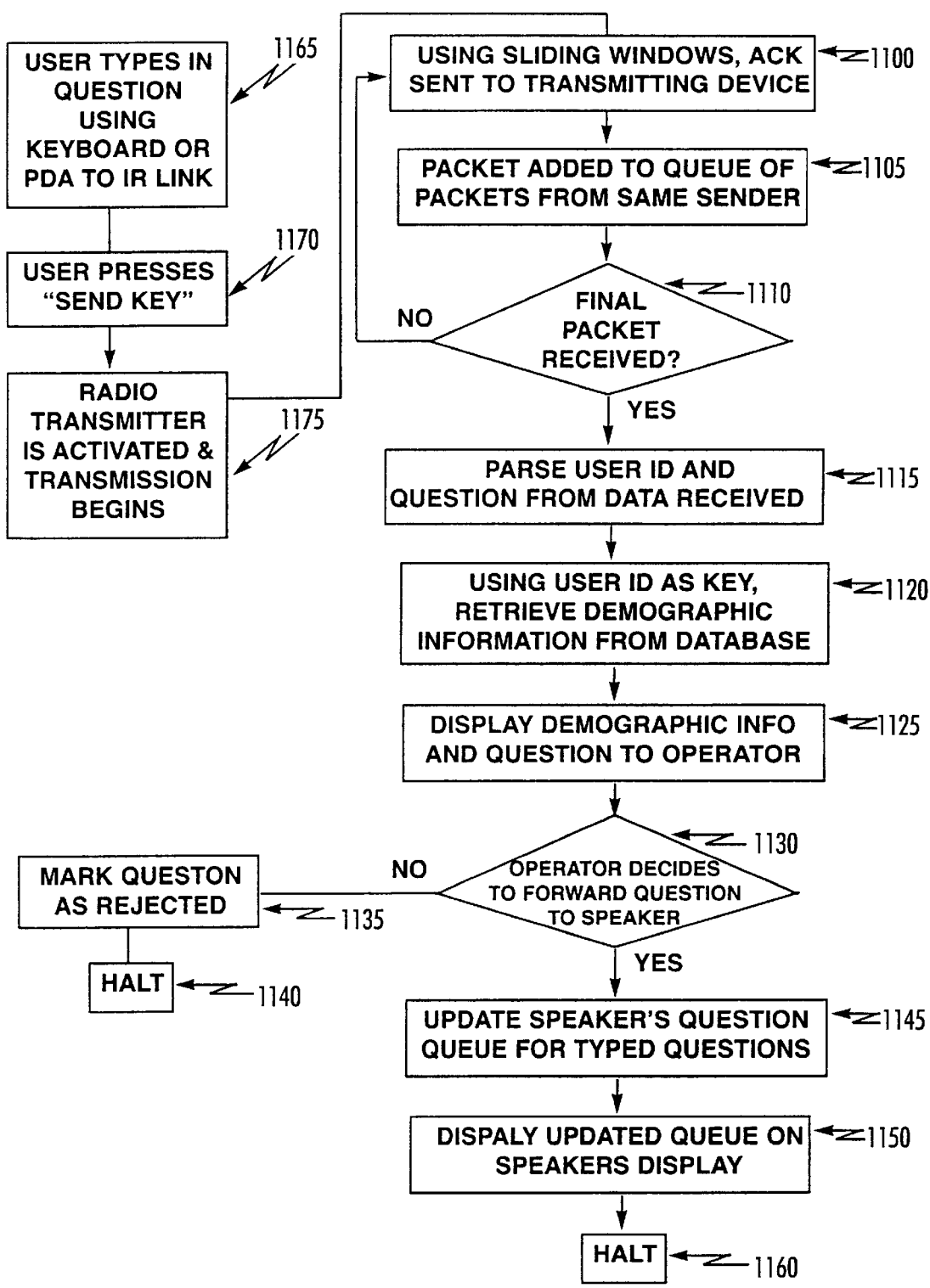
FIG. 11 is a flowchart of a process for the interaction between the central computing device and a remote device when the remote device is used to submit typed questions.

FIG. 11 is a flowchart of a process for the interaction between the central computing device and a remote device when the remote device is used to submit typed questions. The user initiates such a process by typing a question using the remote unit's keyboard or a PDA connected to the remote unit via the IR link (1165). The user then presses the "send" button (1170) to activate the radio transmitter and begin the transmission (1175). The central computing device, using a sliding windows acknowledgment scheme (1100) adds received packets to the queue of packets received from the same sender (1105). When the final packet has been received (1110) then the data is parsed to extract the user's identification number and the question (1115). With the user's identification number as a key, demographic information about the user is retrieved from the database on the central computer (1120). The demographic information and the typed question are displayed to the operator (1125). If the operator decides that the question is not one the speaker would be willing to answer (1130) then the question is marked as rejected (1135) and the process is terminated (1140). Otherwise the queue of typed questions for the speaker is updated (1145), the speaker's display is updated (1150) and the process is terminated (1160).

Figure 12:
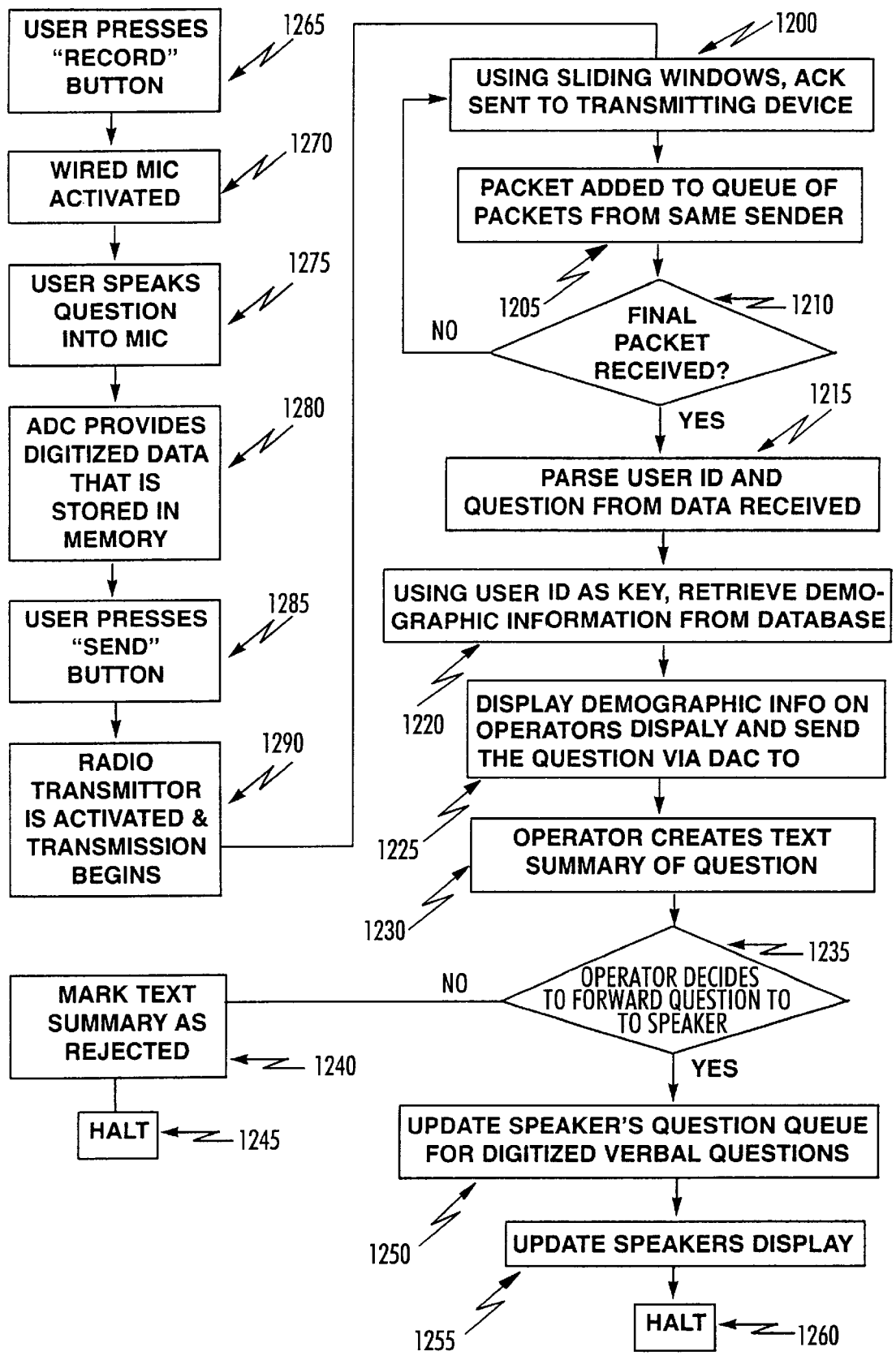
FIG. 12 is a flowchart of a process for the interaction between the central computing device and a remote device when the remote device is used to send a digitized voice question.

FIG. 12 is a flowchart of a process for the interaction between the central computing device and a remote device when the remote device is used to send a digitized voice question. The user initiates such a process by pressing the "record" button on the remote device (1265) which activates the wired microphone (1270) which will now accept the user's spoken question (1275). The analog to digital converter provides digitized voice data that is stored in the unit's memory (1280) The user then presses the "send" button (1285) to activate the radio transmitter and begin the transmission (1290). The central computing device, using a sliding windows acknowledgment scheme (1200) adds received packets to the queue of packets received from the same sender (1205). When the final packet has been received (1210) then the data is parsed to extract the user's identification number and the digitized question (1215). With the user's identification number as a key, demographic information about the user is retrieved from the database on the central computer (1220). The demographic information is displayed to the operator and the digitized verbal question is converted via DAC and played to the operator through the earphones (1225). The operator then creates a text summary of the question (1230). If the operator decides that the question is not one the speaker would be willing to answer (1230) then the summary text is marked as rejected (1240) and the process is terminated (1245). Otherwise the queue of digitized verbal questions for the speaker is updated (1250), the speaker's display is updated (1255) and the process is terminated (1260).

Figure 13:
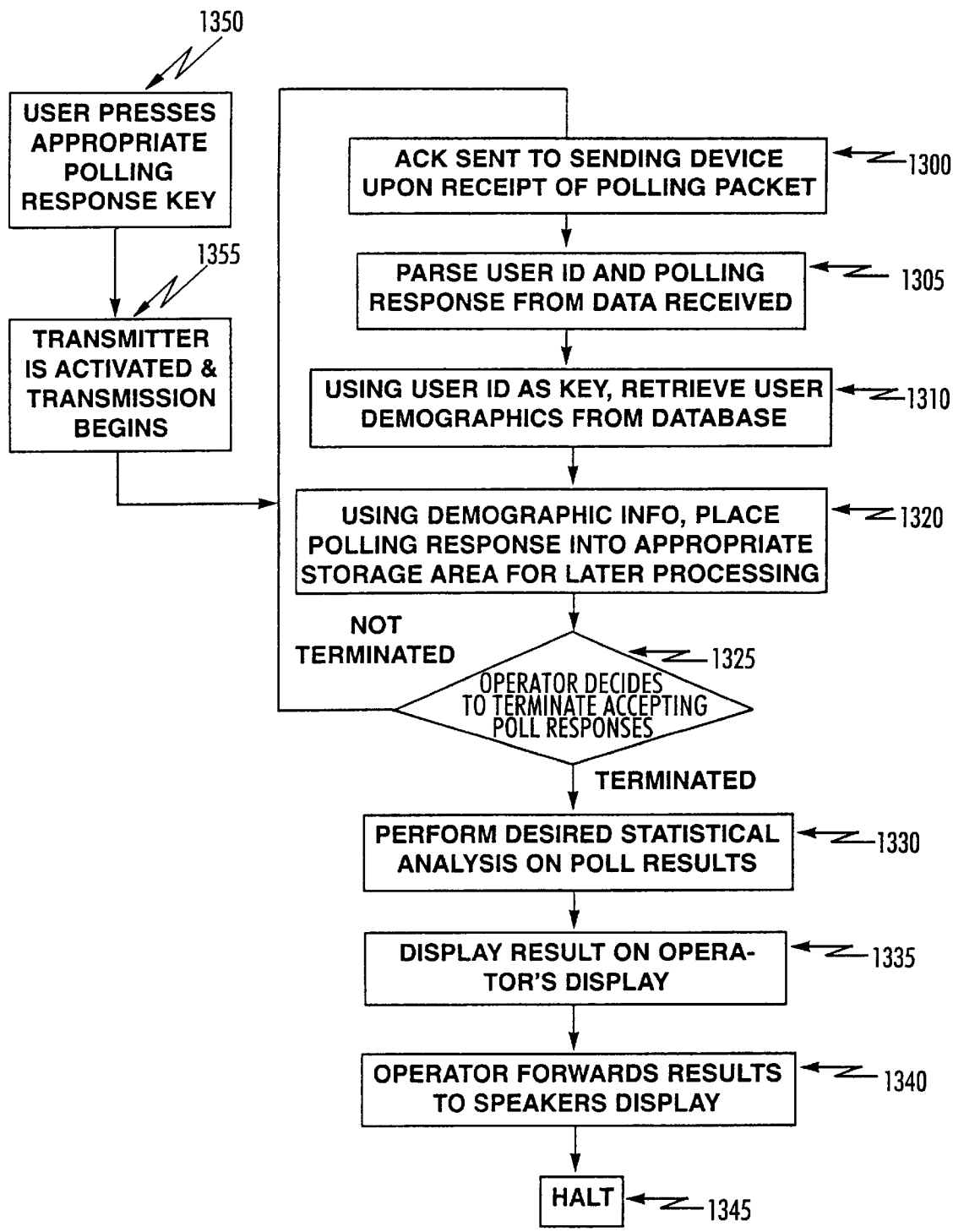
FIG. 13 is a flowchart of a process for the interaction between the central computing device and a remote device when the remote device is used to respond to a polling question.

FIG. 13 is a flowchart of a process for the interaction between the central computing device and a remote device when the remote device is used to respond to a polling question. The user initiates such a process by pressing the appropriate key to indicate his response to the polling question (1350), which, in turn, activates the radio transceiver which then sends the response to the central computing device (1355). The central computing device transmits an acknowledgment upon successful receipt of the polling data packet (1300). The data is then parsed to extract the user's identification number and the polling response (1305). With the user's identification number as a key, demographic information about the user is retrieved from the database on the central computer (1310). The polling response and demographic information are used to determine an appropriate area to store the information for later processing (1320). If the operator decides to discontinue accepting poll responses (1325) then the desired statistical analysis is performed (1330), the results are displayed on the operator's display (1335), the operator then forward the results to the speaker's display (1340) and the process is terminated (1345).

Figure 14:
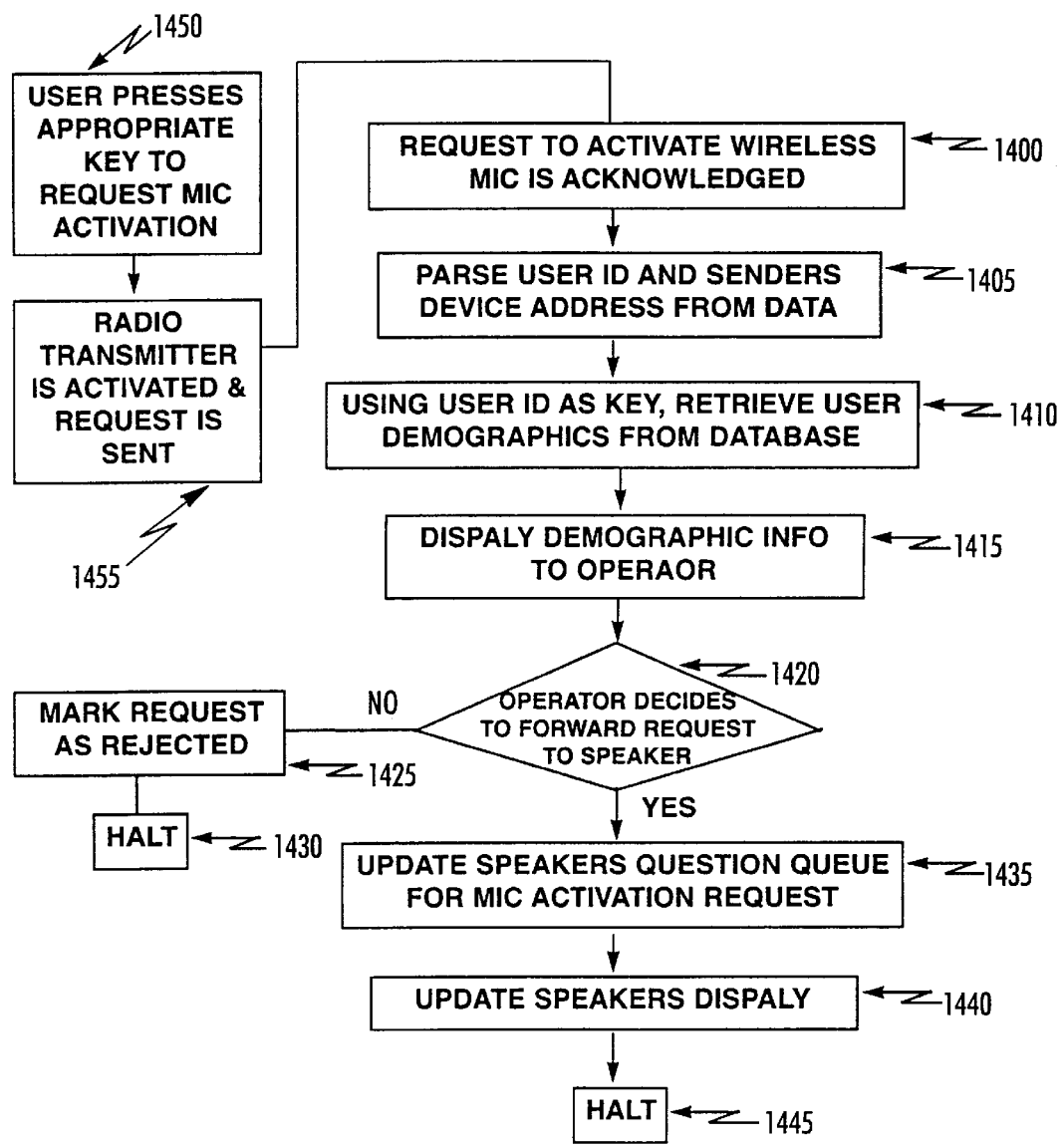
FIG. 14 is a flowchart of a process for the interaction between the central computing device and a remote device when the remote device is used as a wireless microphone.

FIG. 14 is a flowchart of a process for the interaction between the central computing device and a remote device when the remote device is used as a wireless microphone.

The user initiates such a process by pressing the appropriate key on the remote unit's keyboard (1450). That action causes the activation of the radio transmitter and transmission of the request is made (1455). The central computing device acknowledges the successful receipt of the request (1400). When the packet has been received the data is parsed to extract the user's identification number and the device's address (1405). With the user's identification number as a key, demographic information about the user is retrieved from the database on the central computer (1410). The demographic information is displayed to the operator (1415). If the operator decides not to forward the request for microphone activation to the speaker, based on the demographic information (1420), then the request is marked "not accepted" on the operators display (1425) and the process is terminated (1430). Otherwise, the queue of microphone activation requests for the speaker is updated (1435), the speaker's display is updated (1440) and the process is terminated (1445).

Figure 15:
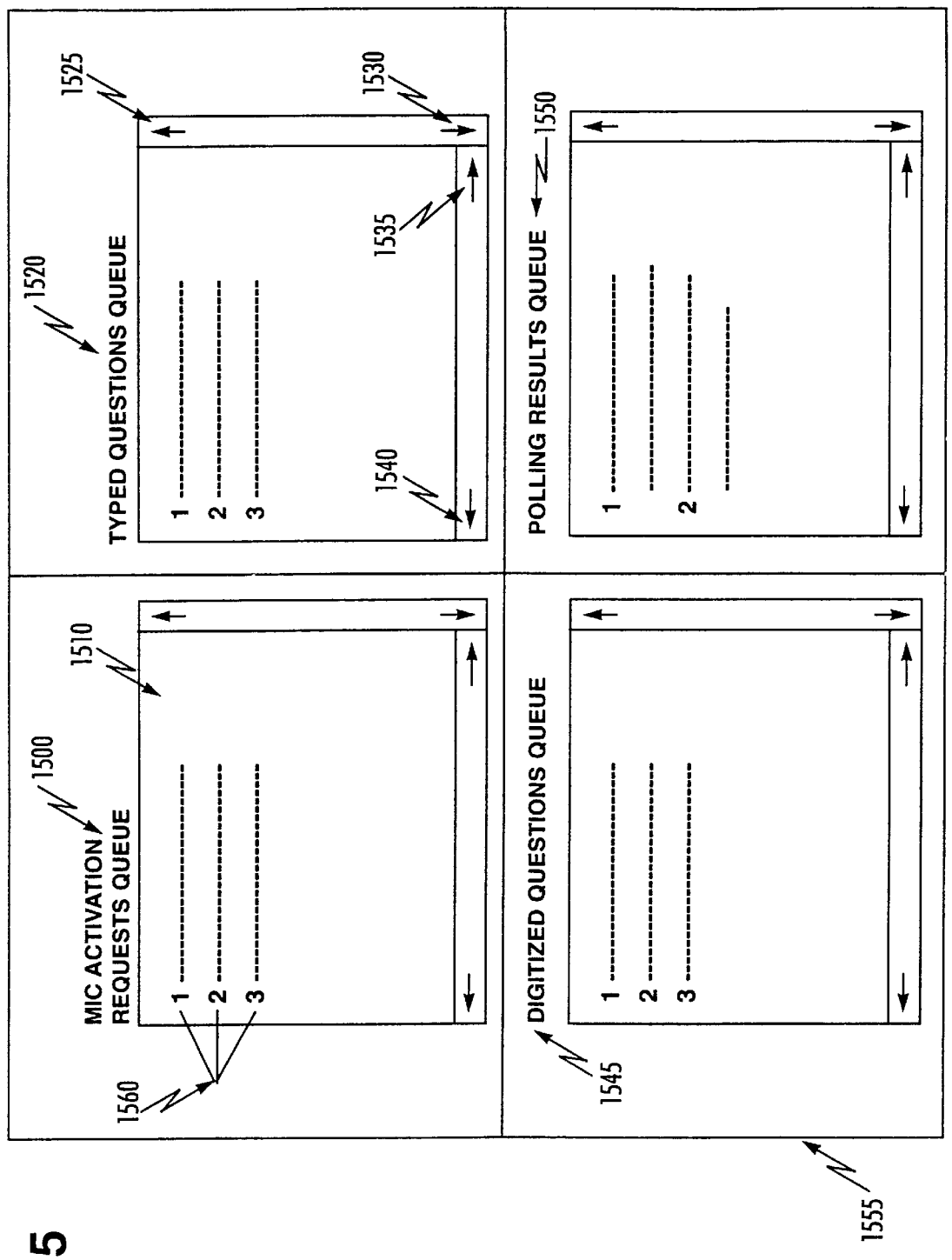
FIG. 15 is an illustration of a speaker's display showing the method of displaying various types of information.

FIG. 15 is an illustration of a speaker's display showing the method of displaying various types of information. The display area (1555) is divided into four windows: the microphone activation request queue (1500), the typed questions queue (1520), the digitized verbal questions queue (1545) and the polling results queue (1550). Each window uses the prior art's method of providing horizontal and vertical scroll bars if the content of the queue will not fit into the display area allocated (1525, 1530, 1535 and 1540). Information within is each window is displayed as text (1560). The speaker selects which window, and within that, which item of information to select, by using a pointing device.

Figure 16:
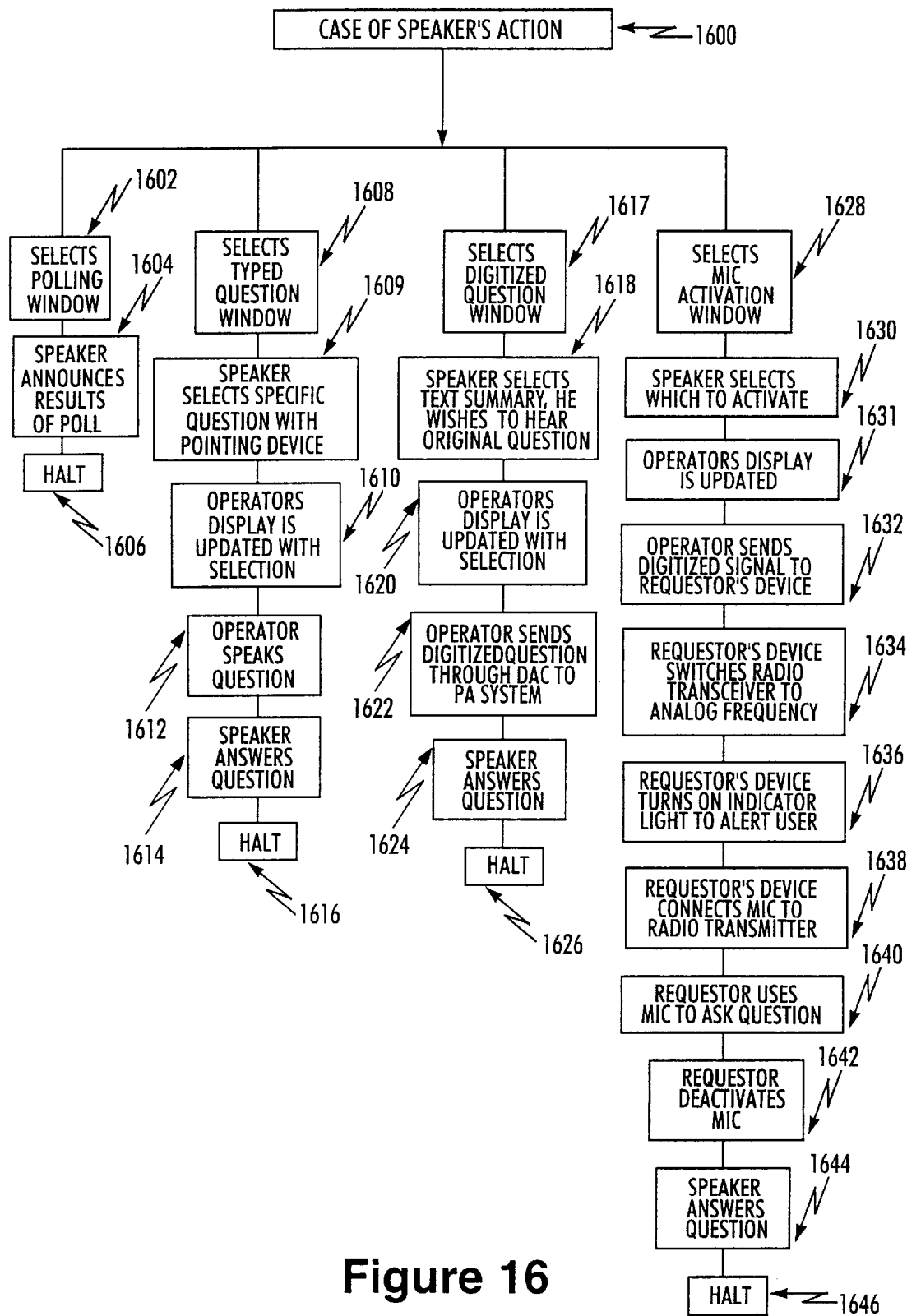
FIG. 16 is a flowchart of a process for the possible actions the speaker may take from the display shown in FIG. 15.

FIG. 16 is a flowchart of a process for the possible actions the speaker may take from the display shown in FIG. 15. The simplest action the speaker may take is to select the polling results window (1602) from which he reads the information necessary to announce to the audience the results of the poll (1604) and the process is then terminated (1606).

If the speaker selects the typed question window (1608) he then may select a specific question within that window (1609). The operator's display is updated to reflect that the speaker has made a selection (1610) and the operator then speaks the question to the audience (1612). The speaker than answers the question (1614) and the process is terminated (1616).

If the speaker selects the digitized question window (1617) he then may select a specific text summary (1618). The operator's display is updated to show the speaker's selection (1620) and the operator sends the digitized question referenced by the text summary through a DAC to the PA system for the audience to hear (1622). The speaker then answers the question (1624) and the process is terminated (1626).

If the speaker selects the microphone activation request window (1628) he then may select which microphone to activate (1630). The operator's display is updated with the speaker's selection (1631). The operator then sends a digital signal to the requester's device address (1632). The requester's device responds by switching the tunable radio transceiver from the digital to the analog frequency (1634), by illuminating a light on the remote device to alert the user to the fact that the microphone is going to be activated (1636) and by connecting the analog microphone to the radio transceiver (1638). The requester than asks his question (1640) and deactivates the microphone (1642). The speaker answers the question (1644) and the process is terminated.

Figure 17:
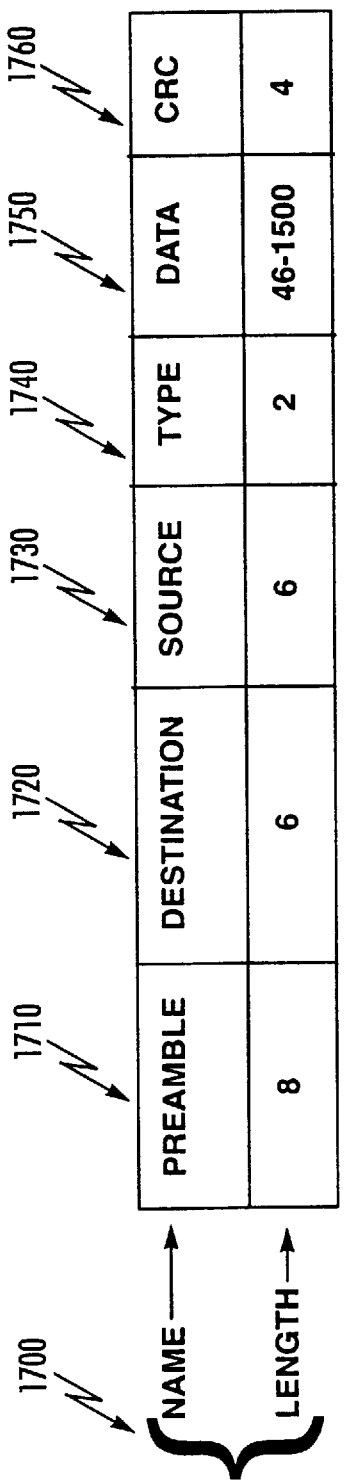
FIG. 17 is an illustration of the structure of an Ethernet packet.

FIG. 17 is an illustration of the structure of an Ethernet packet. The packet (1700) is composed of six segments (1710, 1720, 1730, 1740, 1750 and 1760) each of which is of a specific length. Using a common technique called "locally administered addresses" it is possible, via software, to control the remote device's address at (1730). Embedded within that address it is possible to include useful information such as a unit identifier or location.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

I claim:

1. A terminal for audience participation in a presentation environment, comprising:
   a. a control computer having keys for user activation;
   b. a transceiver connected to said control computer for communicating with a central computer and for communicating with an input to a public address system; and
   c. a wireless transceiver connected to said control computer for connecting to a local computing device other than the central computer.

2. The terminal of claim 1 in which said control computer is configured to control said transceiver to transmit digital information from said keys or from said local computing device to said central computer.

3. The terminal of claim 2, wherein the digital information includes a text question received from the local computing device.

4. The terminal of claim 1 further comprising a microphone selectively connected to said transceiver for connection to said input to a public address system.

5. The terminal of claim 4 in which connection to said input to a public address system occurs upon authorization from said central computer.

6. The terminal of claim 1 further comprising a microphone connected to an analog to digital converter which is connected to said control computer.

7. The terminal of claim 6, in which said control computer is configured to store an audio message in digital form from said analog to digital converter and to send said message to said central computer over said transceiver.

8. The terminal of claim 1 contained within a user worn badge.

9. The terminal of claim 1, wherein said wireless transceiver includes an infra-red transceiver.

10. A central computing device for audience participation in a presentation environment, comprising:
    a. a central computer having a keyboard for operator activation;
    b. a first transceiver connected to said computer for communicating with remote terminals over a data link;
    c. a second transceiver connected to said computer for communicating with remote terminals over an audio link; and
    d. a public address system interface for receiving digitally recorded audio and converting it to analog audio for transmission over a public address system and for receiving analog audio for transmission over said public address system.

11. The central computing device of claim 10 further comprising:
    e. a speaker terminal including a display, a keyboard and a pointing device, said speaker terminal connected to said central computer.

12. The central computing device of claim 10, further comprising a database storing demographic information about users.

13. The central computing device of claim 12, in which said database links said demographic information of a user with an identification of a remote terminal assigned to that user.

14. A method for information exchange between members of an audience and a speaker, comprising the steps of:
    a. providing an element for performing a step of receiving text questions from the audience for the speaker;
    b. providing an element for performing a step of displaying said text questions or summaries thereof; and
    c. providing an element for performing a step of selecting a question from among said text questions for response.

15. The method of claim 14, further comprising the step of:

providing an element for performing a step of displaying demographic information to the speaker about a member of the audience submitting the selected question selected.

16. The method of claim 14 further comprising:

providing an element for performing a step of activating a wireless microphone carried by a member of the audience in response to selecting the question that said member submitted.

17. A method for information exchange between members of an audience and a speaker, comprising the steps of:
    a. providing an element for performing a step of receiving questions from the audience for the speaker in a digitized audio representation and storing the questions;
    b. providing an element for performing a step of displaying summaries of the questions;
    c. selecting a question from among the stored questions for response; and
    d. providing an element for performing a step of playing back the selected question over a public address system.

18. The method of claim 17, further comprising the step of displaying demographic information about the member of the audience submitting the question selected.

19. A system for information exchange between members of an audience and a speaker comprising:
    a. a central computer;
    b. an operator's terminal connected to said central computer;
    c. a speaker's terminal connected to said central computer and having an input device for communicating with said central computer; and
    d. a plurality of remote terminals for members of an audience connected over wireless links to said central computer.

20. The system of claim 19 in which one or more of said remote terminals are connected to a computing device, other than said central computer, over a local wireless link.

21. The system of claim 19, wherein said central computer is configured to display, on said speaker's terminal, text questions received from said remote terminals and receive a selection of a question from among the displayed questions from the input device of the speaker's terminal.

22. The system of claim 19, wherein said central computer is configured to display, on said speaker's terminal, summaries of voice questions received from said remote terminals and receive a selection of a question from among the voice questions from the input device of the speaker's terminal.

* * * * *